July 4, 1972   J. A. DODD, JR., ET AL   3,674,488
METHOD OF MAKING MATCHING PHOTOPRINTING MASTERS
Filed May 21, 1970   4 Sheets-Sheet 1
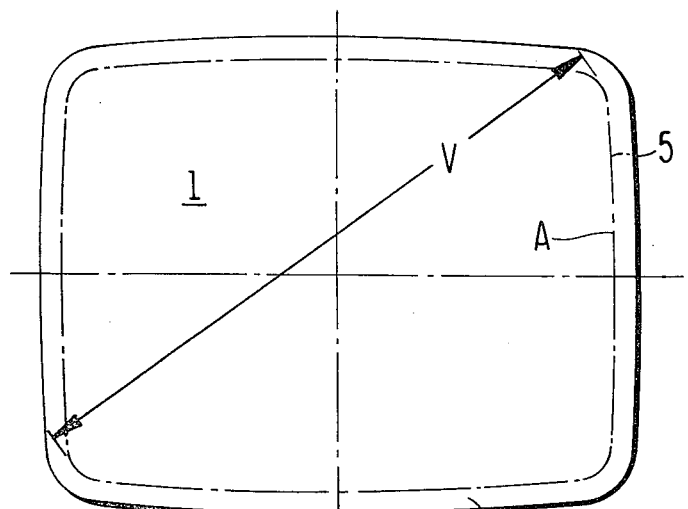
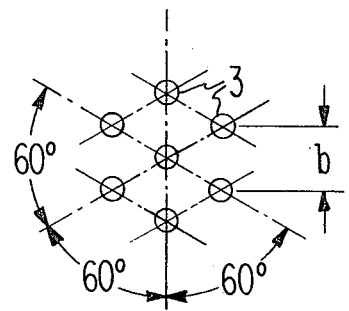
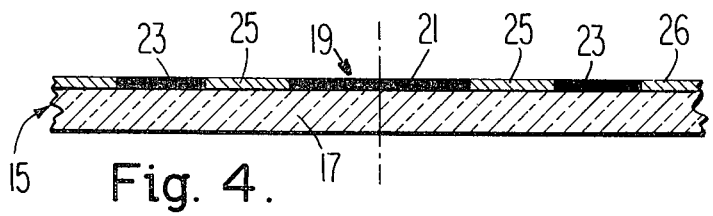
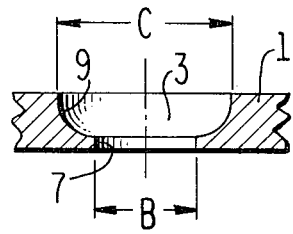
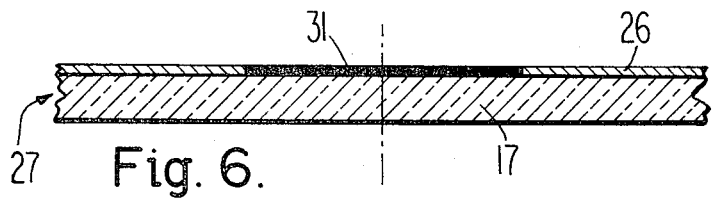
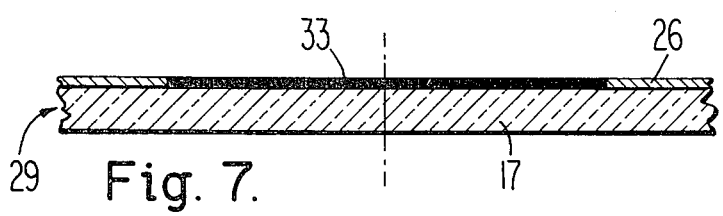
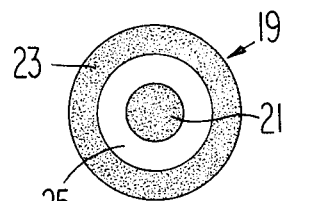
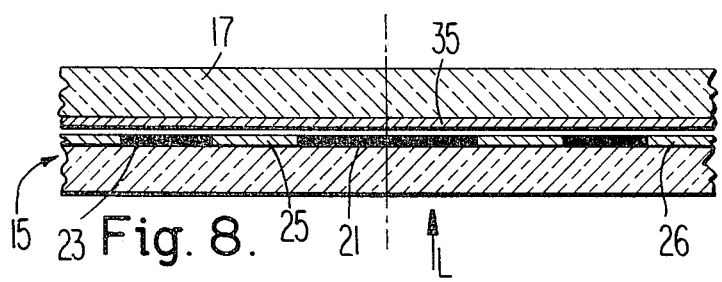
INVENTORS
John A. Dodd, Jr. and
George H. Lines
BY Thomas R. Webb
AGENT INVENTORS
John A. Dodd, Jr. and
George H. Lines
BY Thomas R. Webb
AGENT

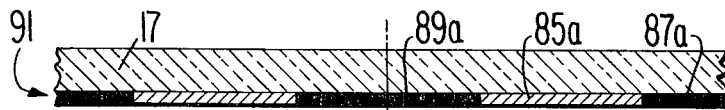
Fig. 21.
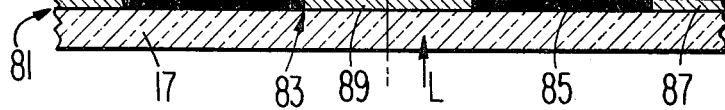
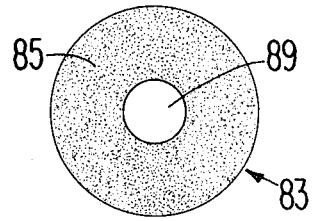
Fig. 22.
Fig. 23.
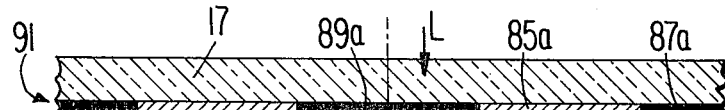
Fig. 24.
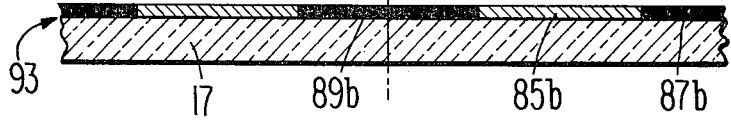
Fig. 25.
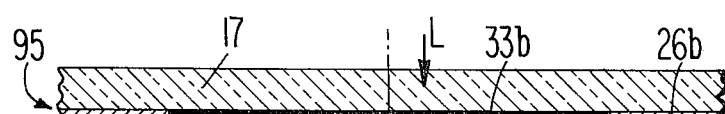
Fig. 26.
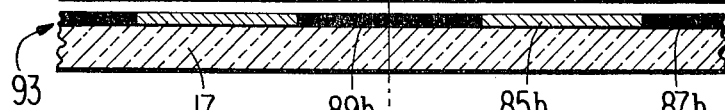
Fig. 27.
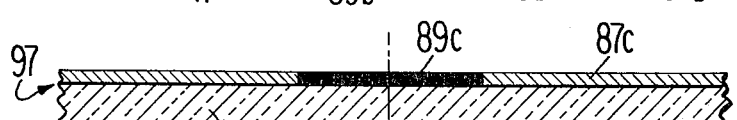
Fig. 28.
INVENTORS
John A. Dodd, Jr. and
George H. Lines.
BY Thomas R. Webb
AGENT 3,674,488
METHOD OF MAKING MATCHING PHOTOPRINTING MASTERS
John Alton Dodd, Jr., Haddonfield, and George Harry Line, Cherry Hill, N.J., assignors to RCA Corporation
Filed May 21, 1970, Ser. No. 39,477
Int. Cl. G03c 5/06; G03f 5/00
U.S. Cl. 96—44
9 Claims

ABSTRACT OF THE DISCLOSURE

Two matched photoprinting masters, one comprising an array of uniform opaque dots of a given size and the other comprising an array of opaque dots of a different size, on a transparent background, with exactly the same pattern, are made by first making an accurate original master, having an array of elemental areas, each containing the outlines of the two different size dots in the two desired matching masters, positioned in the desired pattern on a transparent background, and at least one intermediate original master comprising an array of opaque dots having a diameter intermediate the diameters of the two different size dots, arranged in a pattern closely matching the desired pattern on a transparent background. Then, these two masters are combined by photoprinting techniques, using the intermediate master to mask portions of the outlines of the accurate master, to produce the desired two matching small and large dot masters. These two matching masters may be used in the making of shadow masks for color picture tubes.

BACKGROUND OF THE INVENTION

The present invention relates to the manufacture of two matching multiple-element photoprinting masters or plates having identical patterns of opaque dots or transparent areas of different size, particularly for use in making multi-apertured shadow masks for color picture tubes. The dots or areas are preferably circular, but could have another shape corresponding to the apertures in the shadow mask.

In a conventional shadow mask color kinescope, the viewing screen comprises a mosaic of red, blue and green phosphor dots in a systematic array and color selection is achieved by projecting three electron beams from laterally spaced electron guns through a multi-apertured shadow mask mounted in front of the screen. The color phosphor dots are usually deposited in a hexagonal array of substantially-tangent dots, in which case the shadow mask has a similar hexagonal array of spaced apertures or holes with one aperture for each triangular group of three phosphor dots. The shape of the phosphor dots may be circular, hexagonal, triangular, etc.

The shadow mask is usually made by coating both sides of a thin flat steel sheet with photosensitive layers, exposing each side through a master having an opaque dot pattern of the mask apertures desired, developing the layers to remove the unexposed portions and leave holes therein corresponding to the dots in the masters, and then etching the sheet through the master holes with acid to form the mask apertures. The flat mask is subsequently pressed to the desired curvature. Two different masters with different size dots are used on opposite sides of the mask sheet, in order to form mask apertures that are tapered to a knife edge, to minimize impingement of the beam electrons with the aperture walls. It is conventional to use a shadow mask having graded apertures, that is, apertures of different sizes decreasing in size from a maximum at the center of the mask, as disclosed and claimed in Morrell Pat. 2,755,402, granted July 17, 1956. A large dot master with uniform-size large dots in the desired pattern is made for use in etching the larger portions of the tapered mask apertures; and a small dot master is made with uniform-size small dots in substantially the same pattern, and this small dot master is converted to a graded dot master for use in etching the graded smaller portions of the tapered mask apertures. Heretofore, the large and small dot masters have been made independently from different original masters with as nearly the same pattern as could be obtained. A disadvantage of such masters is that they do not exactly match, in that each master contains small errors in the positions of the dots in the pattern that are not duplicated by corresponding errors in the other master.

SUMMARY OF THE INVENTION

An object of the present invention is to provide a method for making two matched photoprinting masters, one having an array of uniform elemental areas of one size and the other having an array of uniform elemental areas of a different size, with both arrays having exactly the same pattern.

In accordance with the invention, the method comprises the preparation of (1) a highly accurate first original master having an array of uniform elemental areas, each containing the outlines of the two different size areas in the desired matching masters, positioned in the desired pattern, and (2) at least one intermediate original master, which does not require great accuracy, and which has an array of intermediate-size uniform areas positioned in a pattern which closely, but not necessarily exactly, matches the pattern of the accurate master. By multiple photoprinting techniques, the two desired matching masters are prepared from the same accurate master, using the intermediate master as a light mask for portions of the accurate master, or a replica thereof.

Three different embodiments are disclosed, in two of which each elemental area of accurate master consists of a circular central opaque dot identical with the dots in a desired small dot master coaxially surrounded by an opaque ring having an outer diameter equal to that of the dots in a desired large dot master and an inner diameter intermediate the other two diameters; and this accurate master is photographically combined in different ways with two other original intermediate masters, one of which comprises opaque circular dots having a diameter intermediate the small dot diameter and the inner ring diameter of the accurate master, and the other of which comprises opaque circular dots having a diameter intermediate the inner and outer ring diameters of the accurate master. In the third embodiment, each elemental area of the accurate master consists of an opaque ring having an outer diameter equal to that of the dots in the desired large dot master and an inner diameter slightly smaller than that of the dots in the desired small dot master; and only one other original intermediate master, comprising opaque circular dots having a diameter intermediate the inner and outer diameters of the ring of the accurate master, is combined in different ways with the accurate master to produce the desired small and large dot masters.

BRIEF DESCRIPTION OF THE DRAWINGS

FIG. 1 is a plan view of a blank for a multiapertured shadow mask for a color picture tube.

FIG. 2 is an enlarged detail view showing a group of the apertures of the mask blank of FIG. 1.

FIG. 3 is a fragmentary section of the mask blank of FIG. 1 showing one of the apertures.

FIGS. 4, 6 and 7 are enlarged transverse sectional views of single elemental areas of three different original masters used in practicing the method of the present invention.

FIG. 5 is a plan view of the elemental area of the master of FIG. 4.

FIGS. 8 through 14 are schematic views similar to FIGS. 4, 6 and 7 showing the various steps of one embodiment of the method of the invention.

FIGS. 21 through 28 are similar views showing a third embodiment.

DESCRIPTION OF THE PREFERRED EMBODIMENTS

Figure 9:
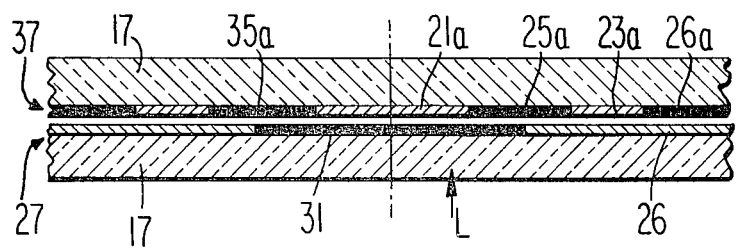

FIGS. 1–3 show a typical blank for a shadow mask for color picture tubes. The mask 1 may be a 6 mil thick sheet of stainless steel having several hundred thousand circular apertures 3 arranged in a predetermined array, for example, a hexagonal array, as shown in FIG. 2. For example, in a 25" color picture tube, the vertical spacing $b$ of the apertures 3 may be about 23 mils, and the apertured area 5 of the mask, bounded by the dot-dash curve A in FIG. 1, may have a maximum (diagonal) viewable dimension V of 22.44 inches. As shown in FIG. 3, each aperture 3 is formed (by etching) with a portion 7 having a smaller diameter B and a portion 9 having a larger diameter C. The diameter C is preferably uniform for all of the apertures. The smaller diameter B of the apertures 3 varies radially from a maximum at the center to a minimum at the outer edge of the mask.

Three alternative methods for making two matching masters will be described in connection with FIGS. 4 through 28. In the description, and in the claims, the following definitions will apply. A photoprinting master or transparency is a layer or sheet of a material having a pattern or array of spaced opaque or transparent (clear) areas on a background of the opposite kind. A positive master is one having opaque areas or dots on a transparent background. A negative master is one having transparent areas in an opaque background. A positive master is also called a dot master or positive dot master, and a negative master is also called a negative dot master or aperture master. A tone reversal is a conversion from clear to opaque, or vice-versa. A positive replica of a given pattern is a mirror-image duplicate thereof with no tone reversal, with or without a change in dot or aperture size. A negative replica of a given pattern is a mirror-image duplicate thereof with a tone-reversal, e.g., opaque-to-clear, or vice-versa, also with or without a change in dot or aperture size. A positive-type emulsion is one, such as Kodak Autopositive Emulsion, in which the exposed areas become clear or transparent upon development, and the unexposed areas remain opaque. A negative-type emulsion is one, such as Kodak Ortho III Emulsion, in which the unexposed areas become clear upon development, and the exposed areas are opaque. A contact print is any print that is photographically produced by exposing portions of a layer of a photosensitive emulsion to light passing through a master or transparency disposed substantially in contact with the emulsion and then developing the exposed emulsion.

One embodiment of the method of the invention is illustrated schematically in FIGS. 4 through 14. FIG. 4 shows an enlarged fragment including one elemental area of an accurate original positive master 15. Master 15 comprises a thin sheet or plate 17 of transparent plastic or glass having a shape similar to the mask blank 1 of FIG. 1, and having thereon a multiplicity of identical elemental areas 19 in an array or pattern corresponding to the desired pattern of apertures in the apertured area 5 of the mask blank 1. Each elemental area 19 is made up of a circular central opaque dot 21, having a diameter equal to the diameter of the dots in the desired small dot master and an opaque ring 23 coaxially surrounding the dot 21 and having an outer diameter equal to the diameter of the dots in the desired large dot master and an inner diameter substantially larger than the diameter of dot 21, thus providing a transparent ring area 25 between dot 21 and ring 23. The space 26 between the elemental areas 19 is tranparent. Accurate master 15 may be made in any known manner. In a preferred method, a fragmentary positive master is prepared by mechanically plotting a small number, e.g., 5, of element areas 19 on a glass plate in the desired hexagonal pattern at an enlarged scale of 30 to 1 over the final size. This fragmentary master is then photographically reduced by 10 to 1 in a camera and converted to a negative master having negative elemental areas enlarged 3 to 1 over the final master. Then, the negative master is mounted in a precision artwork generator or plotter which makes a further reduction in size of 3 to 1 and steps the negative master over the desired area of the surface of a transparent sheet coated with a negative-type emulsion, to produce the desired positive accurate master 15. In one specific example, the dimensions of the dots and rings in each elemental area of the fragmentary master are such that, in the master 15, after the 30 to 1 reduction, the dots 21 have a diameter equal to .0052" (or 5.2 mils) and the rings 23 have an outer diameter of .0152" (or 15.2 mils). The inner diameter of the rings 23 is about 10 mils.

FIGS. 6 and 7 show elemental area fragments of two other original positive masters 27 and 29, respectively, which need not be accurate. Each of masters 27 and 29 comprises a thin transparent sheet 17 similar to sheet 17 of FIG. 4 and having a multiplicity of elemental areas 31 or 33 in substantially the (but not necessarily exactly) the same pattern as those in the accurate master 15, in a transparent background. The elemental areas 31 in master 27 consist of opaque circular dots having a diameter of about 8 mils, intermediate the diameter of dots 21 and the inner diameter of rings 23 of master 15. The elemental areas 33 of master 29 consist of opaque circular dots having a diameter of about 12 mils, intermediate the inner and outer diameters of rings 23 of master 15. Thus, masters 27 and 29 may be called "small dot intermediate" and "large dot intermediate" masters, respectively.

Figure 10:
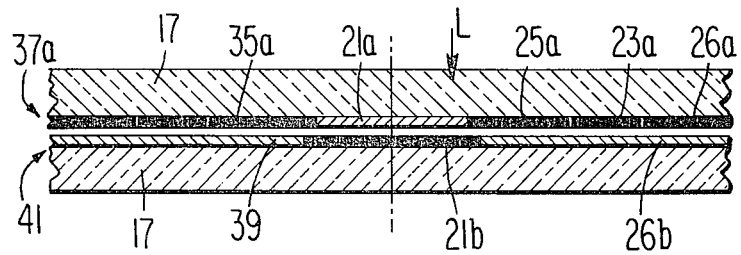

One metod in which the three masters 15, 27 and 29 are used to produce the desired small and large dot masters is shown schematically in FIGS. 8 through 14. First, a transparent sheet 17 is provided with a coating 35 of a negative-type emulsion and placed upon the accurate master 15 with the emulsion down, next to the upper, pattern side of the master, as shown in FIG. 8. Preferably, the parts should be in contact, the slight spacing being shown in the drawing for clarity only. The master 15 is then exposed to uniform light from below, as shown by the arrow L. The light exposes the portions of the emulsion coating 35 that are registered with the transparent areas of the master 15 to produce a transition member 37, shown in FIG. 9, comprising sheet 17 with coating 35a comprising exposed areas 25a and 26a and unexposed areas 21a and 23a. Actually, the areas exposed are slightly larger than the corresponding openings in the master 15 when using a negative-type emulsion, so that the central areas 21a will be about 4.8 mils in diameter, the ring areas 23a will have diameters of about 10.4 and 14.8 mils, in the specific example being described. If the transition member 37 were developed, the unexposed areas would become clear. However, the member 37 is not developed at this time, but instead, is placed on and substantially registered with the pattern of the small-dot intermediate master 27 of FIG. 6, as shown in FIG. 9. Then master 27 is exposed to light from below, as shown by arrow L to expose the ring areas 23a while masking the central areas 21a. The transition member 37 is then developed to clear the unexposed small central areas and leave the remainder of the coating 35a opaque, thus producing a small negative-dot master 37a, as shown in FIG. 10. The master 37a is contact printed to a negative-type emulsion layer 39 on a transparent sheet 17, as shown in FIG. 10, to produce the desired small-dot (positive) master 41 having small opaque dots 21b arranged in exactly the same pattern as the opaque dots 21 in the original accurate master 15. In this conversion from negative master to positive master, the 4.8 mil clear areas 21a produce 5.2 mil opaque dots 21b, as desired.

Figure 11:
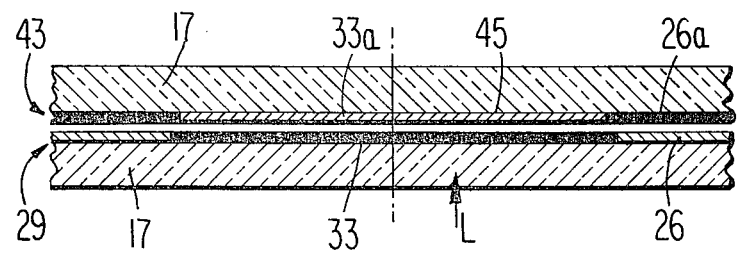
Figure 12:
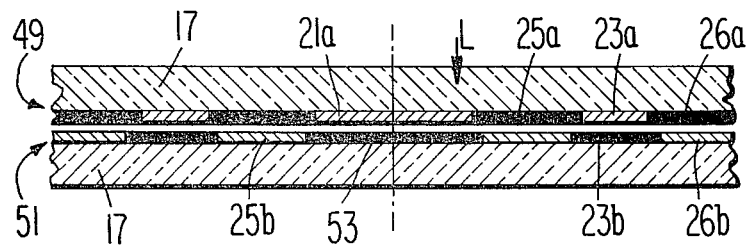
Figure 13:
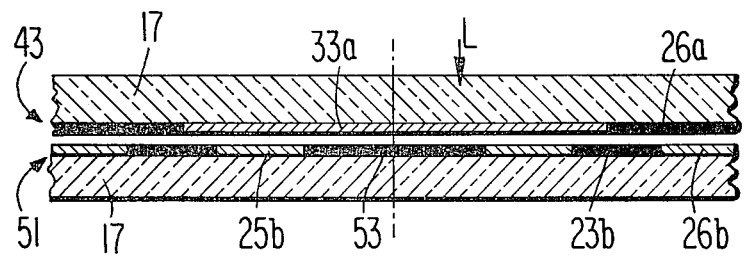
Figure 14:
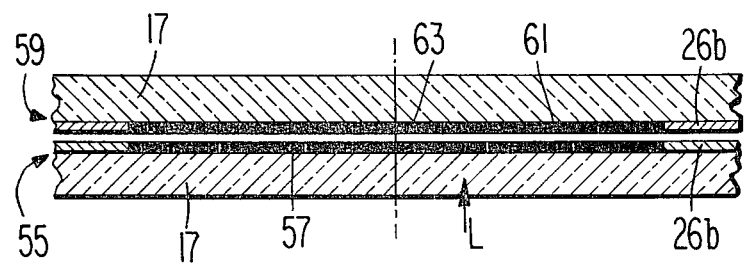

The first step in making the desired large-dot master is to make a negative replica 43 of the large-dot intermediate master 29 of FIG. 7, by contact printing the master 29 to a coating 45 of a negative-type emulsion on a transparent sheet 17, as shown in FIG. 11. This negative replica 43 comprises large transparent areas 33a, having a diameter slightly smaller than that of the large dots 33 in master 29, in an opaque background 26a. The next step is to make a negative replica of the accurate master 15, which may be done by contact printing as in FIG. 10. This negative replica is shown at 49 in FIG. 12, and comprises a transparent sheet 17 having elemental areas each consisting of a clear circular area 21a, a clear ring area 23a and an opaque intermediate ring area 25a, in an opaque background 26a. As shown in FIG. 12, an undeveloped negative replica 51 of the member 49 is produced by exposing a coating 53 of a negative-type emulsion on a transparent sheet 17 to light through the member 49. In this exposure, the clear areas 21a and 23a produce slightly-enlarged exposed areas 21b and 23b in the coating 53 with dimensions substantially equal to the dimensions of areas 21 and 23 in the original accurate master 15. In FIG. 13, the two negative replicas 43 and 51 (of the members 29 and 49) are photographically combined, by juxtaposing them, with the emulsion sides in contact, and with the patterns substantially in registry, and exposing replica 43 to light from above as shown, to expose the areas 25b of replica 51 while masking the background 26b thereof. The replica 51 is then developed to produce a large-dot (positive) master 55 comprising large-dot elemental areas 57, having a diameter of 15.2 mils, in a transparent background 26b, as shown in FIG. 14. A positive replica 59 of master 55 is made, by contact printing master 55 to a coating 61 of a positive-type emulsion on a transparent sheet 17, as shown in FIG. 14, to produce an "upside-down" large-dot master comprising large dots 63 of the same diameter (no change in size during exposure) arranged in exactly the same pattern as the opaque rings 23 in the accurate master 15.

The small-dot master 41 (FIG. 10) and the large-dot master 59 (FIG. 14) have identical patterns, because they are made from the same accurate original master 15. Due to the overlap in each case between the elemental areas of the intermediate masters 27 and 29, or replicas thereof, and the opaque or clear areas associated therewith, the use of these independent originals does not affect the duplication of the pattern of the accurate master 15. Therefore, the large-dot master 59 can be registered with a graded duplicate of the small-dot master 41 on opposite sides of a photoresist coated shadow mask blank or sheet to print exactly matched patterns of small and large holes in the coatings, for etching the desired tapered mask apertures. Thus, any error in the positions of the mask apertures on one side will be duplicated by the same error on the other side.

Figure 15:
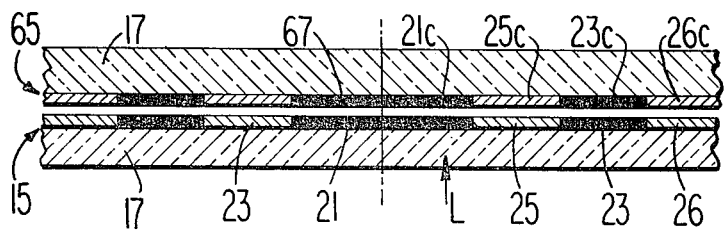
FIGS. 15 through 20 are similar views showing the steps of a second embodiment.
Figure 16:
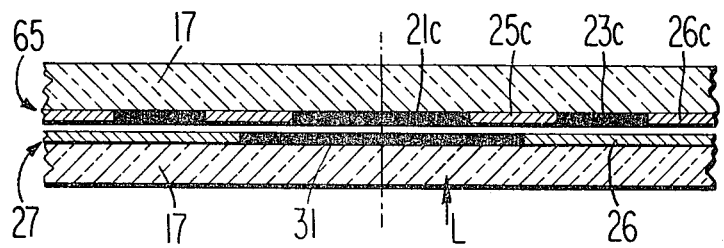
Figure 17:
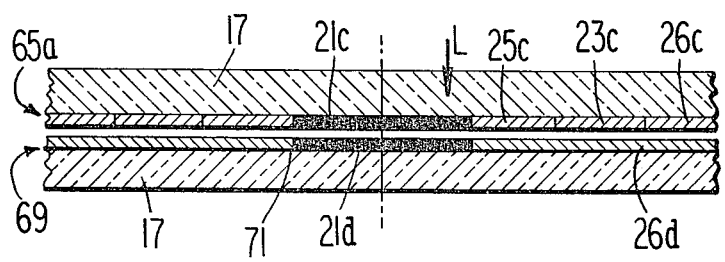

A second embodiment of the method of the present invention is schematically illustrated in FIGS. 15 through 20. First, an undeveloped positive replica 65 of the accurate positive original master 15 is made by exposing a coating 67 of a positive-type emulsion on a transparent sheet 17 to light passing first through the master 15, as shown in FIG. 15. This replica 65 comprises unexposed portions 21c and 23c corresponding exactly to portions 21 and 23 of the master 15, and exposed portions 25c and 26c (background) corresponding exactly to portions 25 and 26 of the master 15. Replica 65 is then juxtaposed to the small-dot intermediate master 27 and exposed to light through master 27, to expose the ring areas 23c, while masking the unexposed central areas 21c, as shown in FIG. 16. The replica 65 is then developed to clear the exposed areas and produce the upside-down small-dot master 65a shown in FIG. 17. In FIG. 17, the master 65a is inverted, or converted to a right-side-up small-dot master 69, by contact printing it to a coating 71 of a positive-type emulsion on a transparent sheet 17. The master 69 comprises 5.2 mil opaque dots 21d on a transparent background 26d in the same pattern as the dots 21 in master 15, and is an exact duplicate of the small-dot master 41 of FIG. 10.

Figure 18:
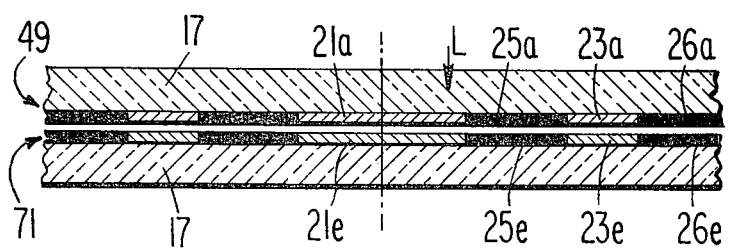
Figure 19:
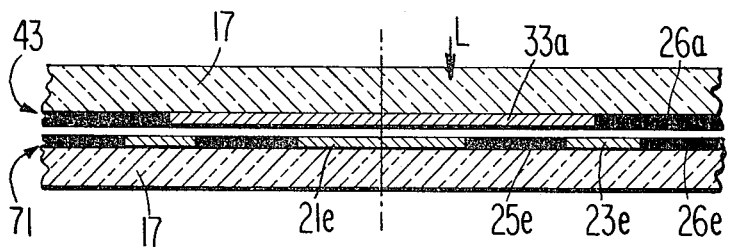
Figure 20:
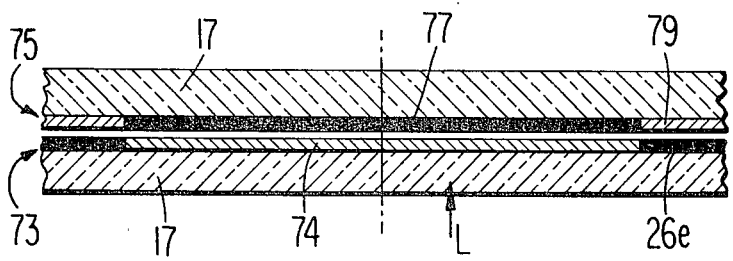

The first step in making the desired large-dot master in the second embodiment is to make an undeveloped positive replica 71 of a negative replica 49 (FIG. 12) of master 15, as shown in FIG. 18. This undeveloped replica 71, which comprises exposed areas 21e and 23e and unexposed areas 25e and 26e, is then exposed to light passing through a negative replica 43 (FIG. 11) of the large-dot intermediate master 29, as shown in FIG. 19, to expose the ring areas 25e, while masking the background 26e. Next, the replica 71 is developed to clear the exposed areas and produce the large-negative-dot master 73, shown in FIG. 20, having large transparent areas 74 in an opaque background 26e. A negative replica of master 73 is made in FIG. 20 to obtain an upside-down large-dot positive master 75 having large (15.2 mils) opaque dots 77 on a transparent background 79. This master 75 is an exact duplicate of the master 59 in FIG. 14, and can be used with a graded duplicate of master 69 (or 41) in making shadow masks.

FIGS. 21 through 28 schematically illustrate a third embodiment of the invention which, in some respect, is simpler than the embodiments shown in FIGS. 4 through 20. In the third method, an accurate original positive master 81 as shown in FIGS. 21 and 22, is prepared, e.g., by the method described above for preparing master 15. Master 81 comprises a transparent sheet 17, similar to sheet 17 of FIGS. 4 through 20, having a multiplicity of elemental areas 83, each consisting of a circular opaque ring 85, having an inner diameter slightly less than the diameter of the dots in the desired small-dot master and an outer diameter equal to the diameter of the dots in the desired large-dot master, on a transparent background 87. In the example chosen, these diameters should be 4.8 and 15.2 mils, respectively. The circular area 89 within each circle 85 is also transparent.

Accurate master 81 is contact printed to a negative-type emulsion, as shown in FIG. 21, to produce a negative replica 91 thereof comprising slightly enlarged (5.2 mils) opaque central areas 89a and slightly reduced (14.8 mils) clear ring areas 85a in an opaque background 87a. Replica 91 is photo-printed to a positive-type emulsion, as shown in FIG. 23, to produce an undeveloped positive replica 93 having exposed areas 85b and unexposed areas 87b and 89b. Replica 93 is an inverted negative replica of the accurate original master 81. The large-dot intermediate master 29 of FIG. 7 is contact printed to a positive-type emulsion to produce a positive replica 95 (FIG. 24) having intermediate size opaque dots 33b on a transparent background 26b. In FIG. 24, the undeveloped replica 93 is exposed to light passing through the replica 95, to expose the background 87b while masking the central areas 89b. The replica 93 is then developed to produce the desired small-dot master 97 of FIG. 25 having the desired accurate pattern of small opaque (5.2 mils) dots 89c in a transparent background 87c, which is exactly identical with the small-dot masters 41 (FIG. 10) and 69 (FIG. 17).

To make the desired large-dot master, an undeveloped positive replica 99 of replica 91 (FIG. 21) is made, as shown in FIG. 26. Replica 99, which is similar to undeveloped replica 93, has exposed ring areas 85d and unexposed areas 87d and 89d, the outer diameters of the ring areas 85d being 15.2 mils in the example chosen. In FIG. 27, the undeveloped replica 99 is exposed to light passing through a negative replica 101 of the large-dot intermediate master 29 (FIG. 7), which replica is the same as member 43 of FIG. 11. This exposes the central areas 89d, while masking the background 87d. The replica 99 is then developed to produce a large-dot negative master 103 having large transparent areas 105 in an opaque background 107, shown in FIG. 28. In FIG. 28, the negative master 103 is contact printed to a negative-type emulsion to produce the desired large-dot (positive) master 109 having large (15.2 mils) opaque dots 111 on a transparent background 113, on a transparent sheet 17. This master 109 is exactly identical to the large-dot masters 59 (FIG. 14) and 75 (FIG. 20), and hence, can be used with a graded duplicate of the small-dot master 97 in making apertures in a shadow mask.

While the invention has been described in connection with a specific example for making a matched pair of positive masters for use in etching shadow masks of color picture tubes, it will be understood that the invention is not limited to this application. Instead, the invention could be used to make a matched pair of masters, either positive or negative, having identical patterns of dots or transparent areas of different kinds, for some other end use.

What is claimed is:

1. A method of making two matching photoprinting masters, one having an array of uniform elemental areas of a given size and given shape and the other having an array of uniform elemental areas of the same shape and a different size, with the elemental areas of both arrays positioned in exactly the same pattern, comprising the following steps:
   (a) making a highly accurate original master having an array of uniform elemental areas, each area containing the two outlines of the two different size elemental areas of the desired matching masters, positioned in the desired pattern, on a transparent background; and
   (b) reproducing each of said two outlines in separate masters while masking the other outline with opaque material, by photoprinting techniques.

2. A method as in claim 1, wherein said masking function is performed by at least one intermediate original master comprising an array of uniform elemental areas having a shape similar to said shape and a size intermediate the sizes of said outlines, positioned in a pattern closely matching said desired pattern.

3. A method as in claim 1, wherein each elemental area of said accurate master consists of:
   (a) an opaque circular area having a diameter equal to the diameter of the elemental areas of one of the desired matching masters; and
   (b) an opaque ring area having an outer diameter equal to the diameter of the elemental areas of the other of the desired matching masters, and an inner diameter intermediate the other two diameters, coaxially surrounding said circular area;
on a transparent background.

4. A method as in claim 3, wherein said masking function is performed by:
   (a) a first intermediate master comprising an array of uniform opaque circular areas having a shape similar to said shape and a diameter intermediate the diameter of said circular areas of said accurate master and the inner diameter of said ring areas, positioned in a pattern closely matching said desired pattern, on a transparent background; and
   (b) a second intermediate master comprising an array of uniform transparent circular areas having a shape similar to said shape and a diameter intermediate the inner and outer diameters of said ring areas, positioned in a pattern closely matching said desired pattern, in an opaque background.

5. A method as in claim 4, wherein:
   (a) an undeveloped replica of said accurate master is photographically combined with said first intermediate master, and then developed and contact printed to produce one of the desired matching masters; and
   (b) an undeveloped replica of said accurate master is registered with and photographically combined with said second intermediate master, and then developed and contact printed to produce the other of the desired matching masters.

6. A method as in claim 1, wherein each elemental area of said accurate master consists of an opaque ring having an inner diameter equal to the diameter of the elemental areas of one of the desired matching masters, and an outer diameter equal to the diameter of the elemental areas of the other of the desired matching masters, in a transparent background.

7. A method as in claim 6, wherein said masking function is performed by:
   (a) a positive replica of an intermediate master comprising an array of uniform opaque circular areas having a diameter intermediate the inner and outer diameters of said opaque rings, positioned in a pattern closely matching said desired pattern, in a transparent background; and
   (b) a negative replica of said intermediate master.

8. A method as in claim 7, wherein:
   (a) an undeveloped replica of said accurate master is photographically combined with said positive replica of said intermediate master and then developed to produce one of the desired matching masters; and
   (b) an undeveloped replica of said accurate master is photographically combined with said negative replica of said intermediate master and then developed and contact printed to produce the other of the desired matching masters.

9. A method as in claim 2, wherein said elemental areas are opaque on a transparent background.

References Cited
UNITED STATES PATENTS

| | | | |
|---|---|---|---|
| 2,687,949 | 8/1954 | Marx | 96—44 |
| 3,202,509 | 8/1965 | Drake et al. | 96—36.2 |
| 2,750,524 | 6/1956 | Braham | 96—36.1 |

NORMAN G. TORCHIN, Primary Examiner

E. C. KIMLIN, Assistant Examiner

U.S. Cl. X.R.

96—45, 36.1, 36.2, 116

UNITED STATES PATENT OFFICE
CERTIFICATE OF CORRECTION

Patent No. 3,674,488                    Dated    July 4, 1972

Inventor(s)     John Alton Dodd, Jr. and George Harry Lines

It is certified that error appears in the above-identified patent and that said Letters Patent are hereby corrected as shown below:

IN THE INVENTOR'S NAME:

George Harry Line should be George Harry Lines.

IN THE SPECIFICATION:

Column 4, line 40:    "metod" should be ---method---.

Signed and sealed this 17th day of October 1972.

(SEAL)
Attest:

EDWARD M. FLETCHER, JR.                 ROBERT GOTTSCHALK
Attesting Officer                        Commissioner of Patents